(12) United States Patent
Oikawa et al.

(10) Patent No.: US 11,169,123 B2
(45) Date of Patent: Nov. 9, 2021

(54) FIELD FLOW FRACTIONATION APPARATUS

(71) Applicant: SHIMADZU CORPORATION, Kyoto (JP)

(72) Inventors: Yukio Oikawa, Kyoto (JP); Shigeyoshi Horiike, Kyoto (JP); Maiko Nakaya, Kyoto (JP); Masaki Kanai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 240 days.

(21) Appl. No.: 16/380,156

(22) Filed: Apr. 10, 2019

(65) Prior Publication Data
US 2019/0317057 A1 Oct. 17, 2019

(30) Foreign Application Priority Data
Apr. 11, 2018 (JP) .............................. JP2018-076071

(51) Int. Cl.
*G01N 30/00* (2006.01)
(52) U.S. Cl.
CPC . *G01N 30/0005* (2013.01); *G01N 2030/0025* (2013.01)
(58) Field of Classification Search
CPC ....... G01N 30/0005; G01N 2030/0025; G01N 2030/003; G01N 2030/004; B01D 2325/46
See application file for complete search history.

(56) References Cited

U.S. PATENT DOCUMENTS

| 5,141,651 A * | 8/1992 | Giddings .......... B01L 3/502753 209/131 |
| 5,193,688 A * | 3/1993 | Giddings .................. B03B 5/00 209/127.1 |
| 6,192,764 B1 * | 2/2001 | Jiang ......................... B03B 5/00 73/865.5 |
| 7,582,482 B2 * | 9/2009 | Dasgupta ........... G01N 30/0005 209/155 |

(Continued)

FOREIGN PATENT DOCUMENTS

| CN | 102262007 A | 11/2011 |
| JP | 2008-000724 A | 1/2008 |

OTHER PUBLICATIONS

Extended European Search Report dated Jul. 9, 2019 in European Application No. 19167779.8.

(Continued)

*Primary Examiner* — Joseph C Rodriguez
(74) *Attorney, Agent, or Firm* — Sughrue Mion, PLLC

(57) ABSTRACT

A field flow fractionation apparatus includes a separation channel provided with an inlet port and an outlet port at both ends and forming a space through which a carrier fluid flows between the inlet port and the outlet port, a separation membrane which is a wall surface that defines the separation channel and is parallel to a channel flow in which a carrier fluid flows in the separation channel from the inlet port toward the outlet port, and has a property of permeating the carrier fluid and not permeating particles to be separated, and a discharge port that discharges the carrier fluid having permeated through the separation membrane to outside. At least a part of the surface of the separation membrane is an ion exchangeable region in which a functional group having ion exchangeability is modified.

3 Claims, 2 Drawing Sheets

(56) References Cited

U.S. PATENT DOCUMENTS

| | | | | |
|---|---|---|---|---|
| 7,691,264 | B2* | 4/2010 | Franzreb | B01D 69/06 |
| | | | | 210/223 |
| 7,993,586 | B2* | 8/2011 | Fujiyama | G01N 33/1846 |
| | | | | 422/82.05 |
| 8,333,891 | B2* | 12/2012 | Wyatt | G01N 30/0005 |
| | | | | 210/637 |
| 10,322,382 | B2* | 6/2019 | Liu | B01D 69/08 |
| 10,800,808 | B2* | 10/2020 | Brellisford | B01D 69/10 |
| 2011/0290724 | A1 | 12/2011 | Wyatt | |
| 2017/0145053 | A1 | 5/2017 | Brellisford et al. | |

OTHER PUBLICATIONS

Communication dated Jun. 22, 2021, issued by the State Intellectual Property Office of the P.R.C. in application No. 201910217527.2.

* cited by examiner

FIELD FLOW FRACTIONATION APPARATUS

BACKGROUND OF THE INVENTION

1. Field of the Invention

The present invention relates to a field flow fractionation apparatus for separating and fractionating fine particles contained in a fluid by using field flow fractionation (Field-Flow).

2. Description of the Related Art

As a technique for separating and detecting and fractionating fine particles having particle sizes in a wide range of about 1 nm to 50 μm dispersed in a solution, so-called cross-flow field flow fractionation has conventionally been known (see, for example, Japanese Patent Laid-Open No. 2008-000724).

A cross-flow field flow fractionation apparatus adopting an asymmetric channel structure has a separation channel for separating samples. One of the wall surfaces forming the separation channel is a semipermeable membrane having pores, such as regenerated cellulose (RC) and polyethersulfone (PES), and a porous flat plate called frit is provided outside the semipermeable membrane. This wall surface permeates the carrier fluid introduced into the channel to generate a flow (cross flow) in a direction perpendicular to the forward flow (channel flow) flowing from the inlet port to the outlet port of the separation channel. Hereinafter, the wall surface side on which the frit is provided in the separation channel is defined as the lower side.

In the separation channel, a flow (focus flow) opposite to the channel flow is formed as needed. A carrier fluid having permeated through the semipermeable membrane forming the wall surface of the separation channel is discharged from an outlet port (discharge port) different from the outlet port of the separation channel. The discharge amount from the frit is controlled by a mass flow controller (MFC) provided on the discharge port side.

A sample is introduced from the inlet port through a sample injector into the separation channel. At this time, a channel flow is generated by the carrier fluid supplied from the inlet port and a counter flow (focus flow) is generated by the carrier fluid supplied from a port on the outlet port side different from the inlet port, in the separation channel. As a result the sample introduced into the separation channel is collected at the boundary portion between the channel flow and the focus flow. This is called focusing.

Sample particles collected by focusing at the boundary portion of a counter current differ in diffusion coefficient due to hydrodynamic radius differences, and hence more diffusible particles are collected on the upper side of the separation channel. This is called relaxation. Thereafter, when the focus flow is stopped and the flows in the separation channel are only a channel flow and a cross flow, smaller sample particles are sequentially discharged from the separation channel via the outlet port due to a Stokes flow. A detector such as an ultraviolet absorbance detector is connected to the outlet port of the separation channel, and for example, as sample particles measured sequentially in ascending order of absorbance in the ultraviolet region (190 nm to 280 nm) by the detector, a fractogram is obtained.

SUMMARY OF THE INVENTION

As described above, the conventional field flow fractionation apparatus separates a sample by utilizing the diffusion coefficient differences among the particles. However, for example, in separating a basic protein (for example, lysozyme) and an acidic protein (for example, bovine serum albumin (BSA)), it is not possible to successfully perform separation based on merely diffusion coefficient differences among particles.

It is, therefore, an object of the present invention to provide a field flow fractionation apparatus with improved separation performance as compared with a conventional field flow fractionation apparatus which performs separation by utilizing only diffusion coefficient differences among particles.

A field flow fractionation apparatus according to the present invention includes a separation channel which comprises an inlet port and an outlet port at both ends, and the separation channel forms a space through which a carrier fluid flows between the inlet port and the outlet port, a separation membrane which is a wall surface that defines the separation channel and is parallel to a channel flow in which a carrier fluid flows in the separation channel from the inlet port toward the outlet port, and has a property of permeating the carrier fluid and not permeating particles to be separated, and a discharge port that discharges the carrier fluid having permeated through the separation membrane to outside. At least a part of the surface of the separation membrane is an ion exchangeable region in which a functional group having ion exchangeability is modified.

A plurality of the ion exchangeable regions having different ion exchangeabilities are arranged side by side in a direction along the channel flow on a surface of the separation membrane. This makes it possible to change the interaction caused between sample particles in the separation channel and implement various kinds of separation in accordance with samples.

In the field flow fractionation apparatus according to the present invention, because at least a part of the surface of the separation membrane forming the wall surface of the separation channel parallel to the channel flow is an ion exchange region in which a functional group having ion exchangeability is modified, it is possible to separate particles not only by the diffusion coefficient differences among the particles but also by the ionic interaction between the particles and the separation membrane. As a result, it becomes possible to separate particles which were difficult to separate perfectly, such as basic protein and acidic protein, and separation performance is improved.

DETAILED DESCRIPTION OF THE INVENTION

An embodiment of a field flow fractionation apparatus will be described below with reference to the accompanying drawings.

Figure 1:
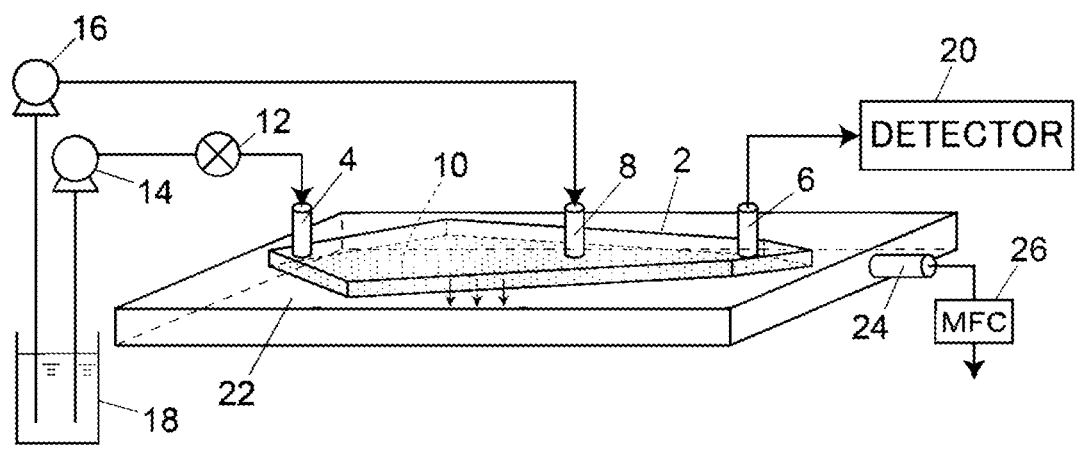
FIG. 1 is a perspective view schematically showing an embodiment of a field flow fractionation apparatus.

First, the configuration of the field flow fractionation apparatus of this embodiment will be described with reference to FIG. 1.

The field flow fractionation apparatus of this embodiment includes a separation channel 2 for separating sample particles. An inlet port 4, an outlet port 6, and an intermediate port 8 communicate with the separation channel 2. The inlet port 4 communicates with one end of the separation channel 2 and the outlet port 6 communicates with the other end of the separation channel 2. The intermediate port 8 is located between the inlet port 4 and the outlet port 6. Although not shown, the separation channel 2 is formed, for example, inside a block formed by stacking a plurality of substrates, and each of the ports 4, 6, and 8 is constituted by a hole provided in the corresponding block.

The separation channel 2 has a substantially rhombic shape. One end portion and the other end portion of the separation channel 2 are corner portions. The width dimension of the planar shape of the separation channel 2 temporarily becomes wider from the one end side to the other end side, and the width becomes temporarily wider from a halfway position to the other end, becomes narrower from the halfway position to the other end, and converges at the other end.

A liquid feed pump 14 for feeding a carrier fluid stored in the container 18 is connected to the inlet port 4 through a sample injection 12. The sample particles to be separated are injected through the sample injection 12 and introduced into the separation channel 2 from the inlet port 4 together with the carrier fluid fed by the liquid feed pump 14. The outlet port 6 communicates with a detector 20.

In the separation channel 2, the flow of a fluid from the inlet port 4 to the outlet port 6 is referred to as a "channel flow". One wall surface (the lower wall surface in FIG. 1) of the separation channel 2 which is parallel to this channel flow is formed from a separation membrane 10 having the property of permeating a carrier fluid but not permeating sample particles. Because a part of the carrier fluid introduced into the separation channel 2 permeates through the separation membrane 10, a flow is generated in the separation channel 2 in a direction indicated by an arrow in FIG. 1, that is, a direction perpendicular to the channel flow. This flow is called a "cross flow". The details of the separation membrane 10 will be described later.

The carrier fluid that has permeated through the separation membrane 10 flows through a waste liquid chamber 22 provided below the separation channel 2 and is discharged to the outside through a waste liquid port 24. A mass flow controller (MFC) 26 is provided on the flow path connected to the waste liquid port 24, and the flow rate of carrier fluid discharged from the waste liquid chamber 22 is detected by the MFC 26.

A liquid feed pump 16 for feeding a carrier fluid from the container 18 is connected to the intermediate port 8. The liquid feed pump 16 is provided independently of the liquid feed pump 14 that supplies a carrier fluid to the inlet port 4, and supplies the carrier fluid from the intermediate port 8 into the separation channel 2 as necessary. When a carrier fluid is supplied into the separation channel 2 from the inlet port 4 and the intermediate port 8 at the same time, opposing flows due to the carrier fluid occur in the separation channel 2. This flow is referred to as a "focus flow".

In this embodiment, the different liquid feed pumps 14 and 16 are respectively connected to the inlet port 4 and the intermediate port 8. However, a common liquid feed pump may be connected to these ports via a switching mechanism such as a rotary valve so that the switching mechanism switches the liquid feed pump between a state in which the pump is connected only to the inlet port 4 and a state in which the pump is connected to both the sample port 4 and the intermediate port 8.

In addition, it is not always necessary to provide the intermediate port 8, and it may be configured in such a way that a carrier fluid is supplied from the outlet port 6 as necessary when forming the focus flow in the separation channel 2.

Here, the separation membrane 10 will be described.

The separation membrane 10 is formed of a semipermeable membrane having a plurality of pores such as regenerated cellulose (RC), polyethersulfone (PES), or the like in which functional groups having cation exchangeability or anion exchangeability are modified. That is, the entire surface of the separation membrane 10 is an ion exchangeable region in which a functional group having ion exchangeability is modified.

Examples of the separation membrane 10 having anion exchangeability include those obtained by modifying the surface of an RC membrane with a cationizing agent. Examples of the cationizing agent include SY-GTA 80 (a product available from Sakamoto Yakuhin Kogyo Co., Ltd.) containing glycidyl trimethyl ammonium chloride (2,3-epoxypropyl trimethyl ammonium chloride) as a main component. Besides this, DEAE (diethylaminoethyl) cellulose and the like can be used as the separation membrane 10 having anion exchangeability.

By using the separation membrane 10 having the anion exchangeability as described above, the retention time of a basic protein, which, intrinsically, is strongly held by the separation membrane 10 is shortened due to the ionic interaction between the separation membrane 10 and sample particles, and separation performance is improved.

As the separation membrane 10 having cation exchangeability, for example, a PES membrane whose surface is sulfonated can be used. Besides this, as the separation membrane 10 having cation exchangeability, an RC membrane having a carboxymethyl group crosslinked on its surface and the like can be used.

By using the separation membrane 10 having cation exchangeability as described above, the retention time of a basic protein, which, inherently, is hardly retained by the separation membrane 10 is increased due to the ionic interaction between the separation membrane 10 and the sample particles, and the separation performance is improved.

The sample separation operation by the field flow fractionation apparatus of this embodiment will be described.

Sample particles are introduced into the separation channel 2 via the inlet port 4 with the carrier fluid. At this time, a carrier fluid is also supplied from the intermediate port 8 into the separation channel 2 to generate a focus flow (counter flow). With this focus flow, the sample particles introduced from the inlet port 4 are collected (focused) at the boundary portion between the flow of the carrier fluid from the inlet port 4 and the flow of the carrier fluid from the intermediate port 8. In the separation channel, a cross flow due to the flow of the carrier fluid permeating through the separation membrane 10 also occurs, and relaxation of sample particles occurs at the boundary portion between the flow of the carrier fluid from the inlet port 4 and the flow of the carrier fluid from the intermediate port 8.

After completion of focusing and relaxation, the liquid feed pump 16 is stopped, and there is no focus flow. In the separation channel 2, a channel flow is generated by the carrier fluid flowing from the inlet port 4 to the outlet port 6, and a cross flow is generated by the carrier fluid permeating through the separation membrane 10.

In this embodiment, the operation speed of the liquid feed pump 14 after the completion of the focusing and relaxation is controlled to be constant, and the flow rate of carrier fluid discharged from the discharge port 24 by the MFC 26, that is, the flow rate of cross flow, is controlled. As a result, the flow rate of carrier fluid flowing out from the outlet port 6 becomes constant. A flowmeter may be provided in place of the MFC 26 on the flow path from the discharge port 24 so that the liquid feed pump 16 is controlled based on the flow rate detected by the flowmeter so as to make the flow rate of carrier fluid flowing out from the outlet port 6 become constant.

The sample particles collected at a predetermined position by focusing and relaxation flow toward the outlet port 6 while being influenced by the ionic interaction with the separation membrane 10 and the influence of the cross flow, and are introduced into a detector 20 and detected in ascending order of influence.

FIG. 2 is a fractogram of a mixed sample of BSA and lysozyme as a sample which is obtained by a field flow fractionation apparatus, in which (A) represents a comparative example and (B) represents the embodiment. In the comparative example (A), an RC membrane having no ion exchangeability is used instead of the separation membrane 10. In the embodiment (B), a cation exchange membrane (SPES: sulfonated poly ether sulfone membrane) is used as the separation membrane 10.

Figure 2A:
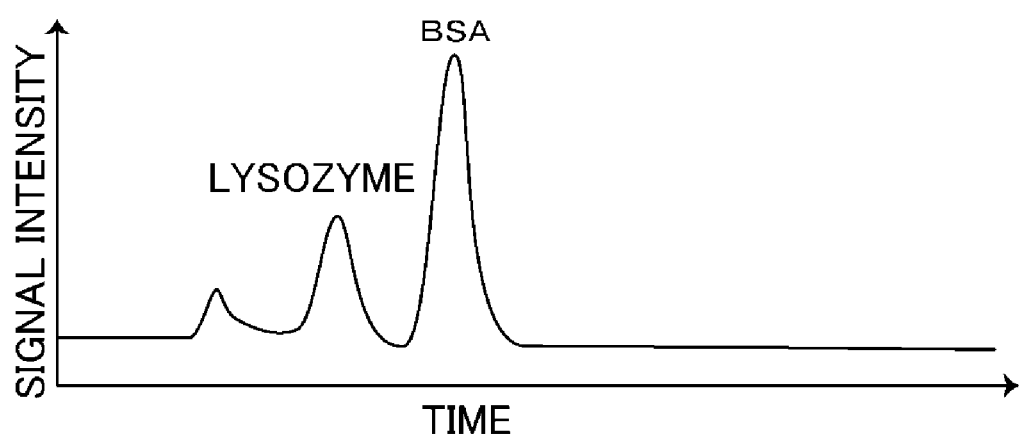
FIG. 2A is a diagram showing an example of the fractogram obtained by a conventional field flow fractionation apparatus.
Figure 2B:
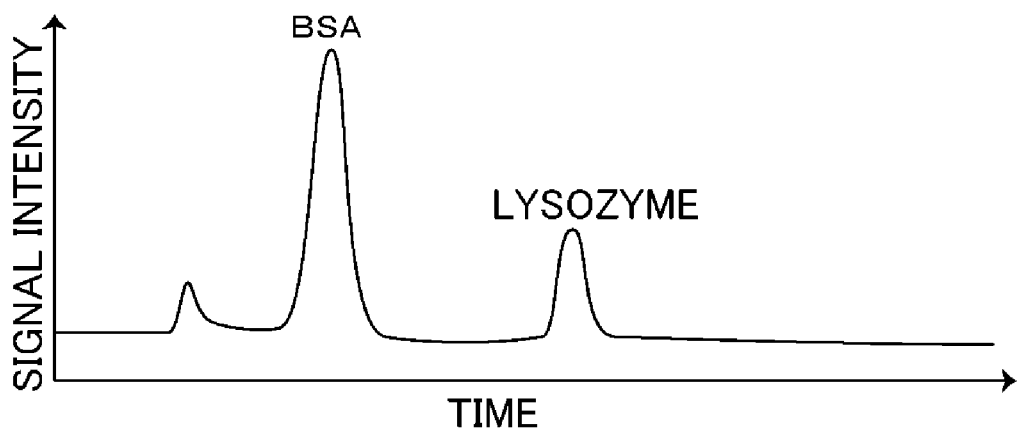
FIG. 2B is a diagram showing an example of the fractogram obtained by a field flow fractionation apparatus of the same embodiment.

As shown in FIG. 2A, when an RC membrane having no ion exchangeability is used, the retention time of BSA is close to the retention time of lysozyme. It is, therefore, difficult to completely separate these proteins. On the other hand, as shown in FIG. 2B, by using a cation exchange membrane as the separation membrane 10, the retention time of BSA, which is an acidic protein, is shortened, and the retention time of lysozyme, which is a basic protein, is increased. This makes it possible to completely separate these proteins.

Accordingly, letting the separation membrane 10 have ion exchangeability can separate even particles which cannot be sufficiently separated only by diffusion coefficient differences using ionic interaction. That is, the separation performance of the field flow fractionation apparatus was found to be improved.

Figure 3:
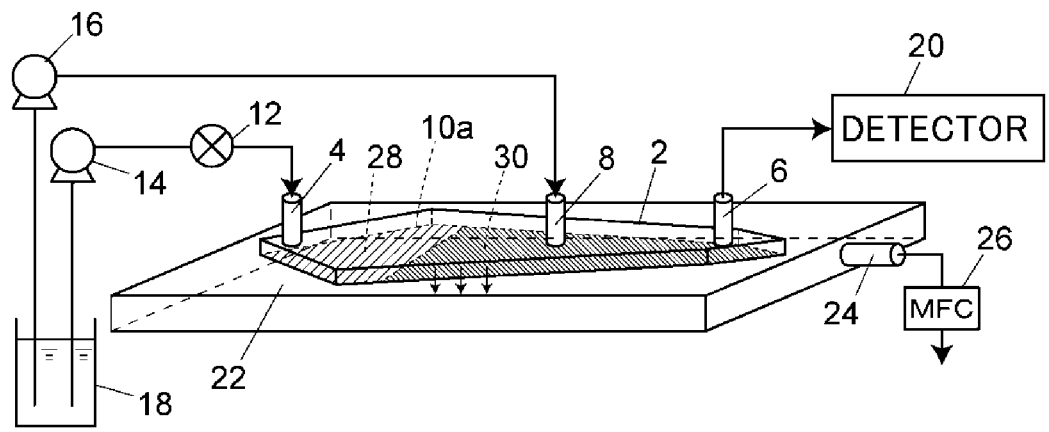
FIG. 3 is a perspective view schematically showing another embodiment of a field flow fractionation apparatus.

In the embodiment described above, the entire surface of the separation membrane 10 is an ion exchangeable region modified with the same ion exchange functional group. However, the present invention is not limited to this. Only a part of the surface of the separation membrane 10 may be an ion exchangeable region. As shown in FIG. 3, the surface of a separation membrane 10a may be divided into an upstream region 28 and a downstream region 30, and the regions 28 and 30 may be modified with functional groups having different ion exchangeabilities. This will provide a plurality of ion exchangeable regions 28 and 30 having different ion exchangeabilities on the surface of the separation membrane 10a in a direction along the carrier fluid flow direction.

What is claimed is:

1. A field flow fractionation apparatus comprising:
   a detector for detecting fine particles,
   a separation channel comprising an inlet port and an outlet port at both ends, wherein the separation channel forms a space through which a carrier fluid flows between the inlet port and the outlet port, and the outlet port leads to the detector;
   a separation membrane which is a wall surface that defines the separation channel and is parallel to a channel flow in which a carrier fluid flows in the separation channel from the inlet port toward the outlet port, and has a property of permeating the carrier fluid and not permeating particles to be separated; and
   a discharge port that discharges the carrier fluid having permeated through the separation membrane to outside, wherein
   at least a part of the surface of the separation membrane is adapted with at least one ion exchange functional group.

2. The field flow fractionation apparatus according to claim 1, wherein the surface of the separation membrane adapted with the at least one ion exchange functional group further comprises a plurality of ion exchangeable regions having different ion exchangeabilities arranged side by side in a direction along the channel flow on a surface of the separation membrane.

3. The field flow fractionation apparatus according to claim 1 further comprising:
   a waste liquid chamber provided below the separation channel, wherein
   the carrier fluid having permeated through the separation membrane is collected in a discharge chamber prior to passing through the discharge port.

\* \* \* \* \*